United States Patent [19]

Raspet et al.

[11] 4,071,069
[45] Jan. 31, 1978

[54] SNOW CHAIN FOR TIRES OF MOTOR VEHICLES FOR QUICK MOUNTING

[75] Inventors: Jernej Raspet, Radovljica; Marjan Žagar, Jesenice, both of Yugoslavia

[73] Assignee: Slovenske zelezarne Tovarna Verig s.p.o., Lesce, Yugoslavia

[21] Appl. No.: 705,110

[22] Filed: July 14, 1976

[30] Foreign Application Priority Data

July 29, 1975 Yugoslavia .......................... 1932/75

[51] Int. Cl.² .............................................. B60C 27/12
[52] U.S. Cl. ................... 152/213 A; 152/219; 152/239
[58] Field of Search ............... 152/213 R, 213 A, 219, 152/239, 241

[56] References Cited
U.S. PATENT DOCUMENTS

| 1,573,631 | 2/1926 | Cheape | 152/213 A |
| 1,989,217 | 1/1935 | Sisk | 152/213 A |
| 2,537,392 | 1/1951 | Bettcher | 152/241 |
| 2,737,994 | 3/1956 | Worner | 152/213 R |

Primary Examiner—Drayton E. Hoffman

Attorney, Agent, or Firm—Karl F. Ross

[57] ABSTRACT

A small chain for a vehicle tire has an inner chain member adapted to lie along a flank of the tire and of a circumference substantially equal to the circumference of the tire in the region at which this inner chain member lies, the ends of the inner chain member having a hook and an eye for mutual engagement.

An outer chain is composed of two chain members which are interconnected by a hook and eye, the outer chain having a length in excess of the circumference of the tire in the region in which the outer chain lies thereagainst, the end of one member being formed with an eye and the end of the other member of the outer chain having an S-hook. The inner and outer chains are bridged by two sections of transverse chains linked to the inner and outer chains over the entire circumference of the tire. Each of the outer chain members is provided with a torsion-type spring whose legs are connected to the respective member at spaced apart locations and which are formed with central eyelets through which the longer outer chain member is threaded or anchored. A resilient insert is fitted into each of these eyelets.

1 Claim, 4 Drawing Figures

SNOW CHAIN FOR TIRES OF MOTOR VEHICLES FOR QUICK MOUNTING

FIELD OF THE INVENTION

The invention relates to a snow chain for tires of motor vehicles, for quick mounting, which does not require time-consuming shifting of the vehicle and in the case of deep snow does not require the removal of the snow from the ground in the vicinity of the tire on which the snow chain ought to be mounted.

BACKGROUND OF THE INVENTION

There are known conventional snow chains for passenger cars the construction of which is such as to require shifting or displacement of the vehicle when said chain is to be mounted on the respective tire. This shifting or displacement of the vehicle is done at least once and is time consuming and inconvenient, especially when there is a deep snow to be removed around the wheel or tire on which the snow chain is to be mounted.

In order to overcome the previously cited inconveniences of conventional snow chains various solutions have been proposed. Among other expedients for driving and starting in snow there are known those which have the form of laths arranged frontally on the wheel and generally screwed on the felly. These devices make impossible fast and quiet driving on a snow covered road. A further inconvenience is that the profile of the tire is not provided with engaging elements on its entire circumference, which causes nonuniform engagement of the wheel with the snow covered surface. A further snow chain for quick mounting without the need of vehicle shifting is composed of two frames of rectangular form which are bent accordingly to the profile of the tire. The frames are mutually connected by means of lateral chains and a net of transverse chain is arranged between said lateral chains. The known snow chain is tightened on the tire of the vehicle by means of a special straining device, only on the outer side of the vehicle wheel, while on the inner side of the wheel the frames are not connected between them and hence these frames can fall off the respective tire or wheel of the vehicle.

Furthermore, the frames are very massive and cause strong vibration during driving and the profile of the tire is equipped with chain only on two-thirds of its circumference. This kind of snow chain does not allow high driving speeds.

Another known snow chain for quick mounting comprises three J-shaped laths on which straight portions are pivotally connected by means of a rivetted bolt, while the bent portions rest on the profile of the tire. Between the laths there are arranged the lateral chains fastened to said laths by means of rivets and equipped between each other by a net of transverse chain extending approximately on two thirds of the tire's profile. During driving with this kind of snow chain one can feel strong jolts due to said laths being spaced apart by an angle of 120°.

OBJECT OF THE INVENTION

The object of the invention is to eliminate the insufficiencies of the known kinds of snow chains and to provide a new snow chain for quick mounting without the need of shifting the vehicle when mounting said chain, and to provide a snow chain with a good engagement in the snow and a quiet drive on a sparely snow-covered road as well as in a deep layer of snow.

SUMMARY OF THE INVENTION

This object is achieved by a snow chain according to the present invention which comprises two lateral chains, the lateral chain disposed on the inner side of the wheel and made of one undivided chain and being spread out represents a single piece of chain equipped on one end with a hook and on the other end with a ring, both previously mentioned elements being intended for the connection of said chain. The length of the inner undivided lateral chain is chosen in such a manner as to correspond with the circumference of the tire that said chain is resting upon. The lateral chain at the outer side of the wheel is made of two sections, the length of one is equal to approximately one half of the circumference of the tire in the region at which this outer chain lies, while the length of the other chain section exceeds half the length of this circumference and serves for the tightening of said longer chain section on the tire or wheel respectively and for the connection of the longer chain section to the shorter one of the outer lateral two-piece chain. On the shorter and on the longer chain section of said two-piece outer lateral chain are fixed respective mounting springs provided with eyelets. The external circumferential ends of the two-piece outer chain are provided with a hook and a ring respectively for the connection of both chain sections (as this is the case with the one-piece inner lateral chain). The end of the longer chain section of the two-piece chain at the middle of the length of connection of both sections is provided with an S-hook, while the end of the shorter chain section of said two-piece chain is provided with a ring at the connection point in the middle of connection of two chain sections.

The transverse connection between the inner one-piece lateral chain and the outer two-piece lateral chain is effected by means of two net sections of the transverse chain, which can have different designs and is connected to the one-piece inner lateral chain and to said two-piece outer lateral chain by means of welded oval members, whereby opened members are used for the connection of the ends of both net sections of the transverse chain.

A further characteristics of the invention is a specially sloped insert to be received in the eyelets of the previously mentioned mounting springs the role of which will be described in the description to follow.

BRIEF DESCRIPTION OF THE DRAWING

The invention will be explained in detail on the basis of the embodiment and attached drawing in which.

SPECIFIC DESCRIPTION

Figure 1:
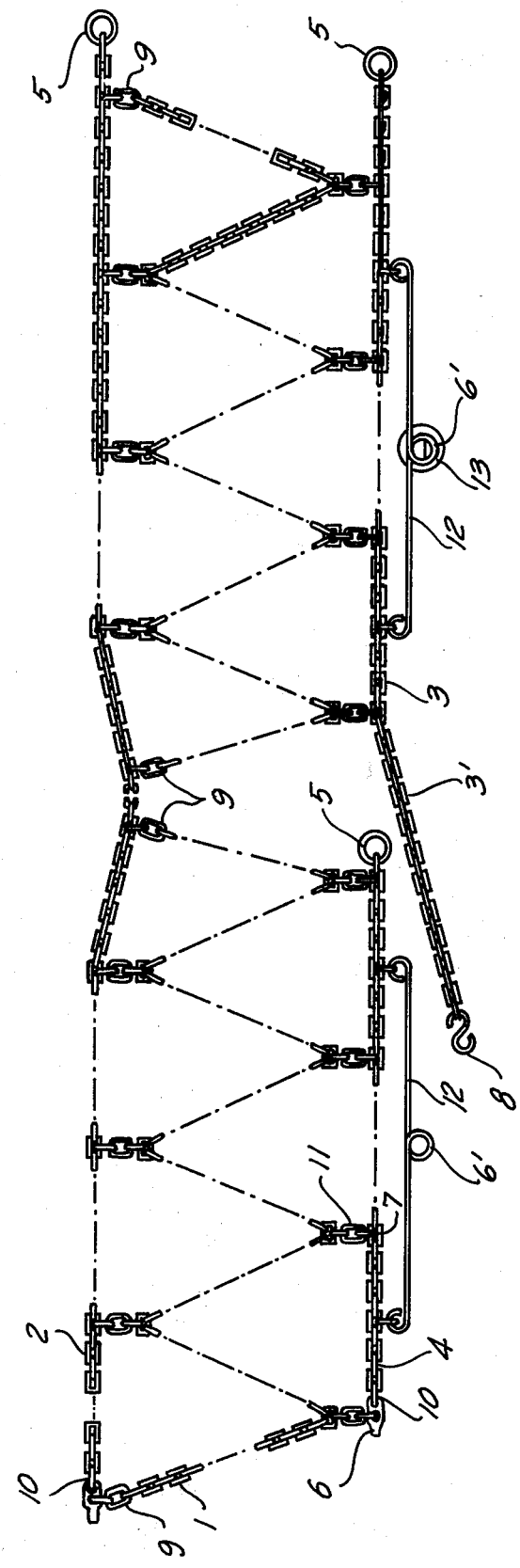
FIG. 1: is a plan view of a snow chain for tires of motor vehicles, for quick mounting in an extended state.
Figure 2:
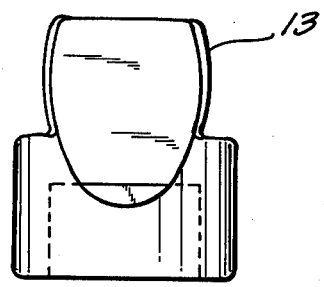
FIG. 2: is an elevational view of the insert.
Figure 3:
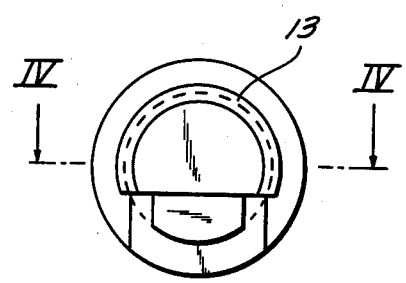
FIG. 3: is a view of the insert.
Figure 4:
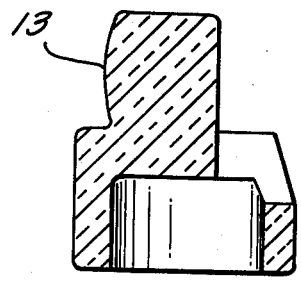
FIG. 4: is a section along line IV—IV of FIG. 3.

As obvious from FIG. 1, the snow chain for tires of motor vehicles, for quick mounting, consists of a one-piece inner lateral chain 2 and of a two-piece outer lateral chain 3'. The length of the undivided or one-piece inner lateral chain 2 is chosen so as to correspond to the circumference of the tire at the region at which it rests upon the tire. One-piece inner lateral chain 2 is provided on one end with hook 6 and on the other with ring 5. The transverse connection between said one-piece inner lateral chain 2 and the two-piece outer lateral chain 3' is made by means of two net sections of transverse chain 1 which may have different designs or patterns respectively and which is fixed to said one-piece inner lateral chain 2 and to said two-piece lateral chain 3' by means of welded members (links) 11 and oval members 7 or by means of open (loop) members 9 at its ends (FIG. 1). The two-piece outer chain 3' is made in such a way that the length of the shorter section 4 is equal to approximately one half of the circumference of the tire in the region in which this chain rests upon the tire, while the length of the longer section 3 of the outer lateral chain 3' is longer than a half of this circumference at the tire, whereby this chain section 3 serves for the tightening of the snow chain, already put on the tire, during its connection to the shorter chain section 4. One of the extreme circumferential ends of the shorter chain section 4 of the two-piece outer lateral chain is provided with a hook 6 for connection with ring 5 arranged at one end of the longer chain section 3 of said two-piece outer lateral chain. The other end of the shorter chain section 4 of the two-piece outer lateral chain is provided with a ring 5, while at the other end of the longer chain section 3 of the two-piece outer lateral chain there is an S-hook. Parallel to the shorter chain section 4 and the longer chain section 3 of the outer lateral chain extend two mounting springs 12 provided with eyelets 6', whereby during the mounting after the connection of both chain sections 4 and 3, the introduction of the hook 8, belonging to the chain section 3, through said ring 5 at the chain section 4, and by passing said chain section 3 through the ring 5 and introducing said hook 8 and passing chain section 3 through eyelets 6' of both springs 12, a final setting of the chain upon the tire is attained, elastic inserts 13 being filled in each eyelet 6'.

The snow chains for tires of motor vehicles, for quick mounting, are set upon the tire in this way.

When looking frontally at the wheel or tire respectively on which the snow chain should be mounted, the chain is first laid on the ground in stretched state at the right side of the wheel. The chain is then gripped at the left mounting spring and pulled at the inner side of the wheel in such a way that two-piece outer lateral chain 3' with both mounting springs 12 is turned towards the outer front side of the wheel and the longer chain section 3 of the outer lateral chain lies at the right side. Then both springs belonging to chain section 3 and 4 of the two-piece outer lateral chain are seized by both hands and pulled towards the front side of the wheel. Afterwards the hook 6 and the ring 5 of the inner lateral chain 2 are drawn along the circumference of the tire in the upward direction (so that the inner lateral chain comes as far as the axis of the wheel), then said hook and ring are pulled towards the outer side they are connected and laid on the tire. Now we connect the two-piece outer lateral chain 3' by means of hook 6 and ring 5 at the upper side of the tire. Then the inner lateral chain 2 is pushed on the upper side of the tire. The extension of the chain section 3 of the two-piece outer lateral chain with the hook 8 is introduced into the ring 5 of the chain section 4 and is strongly pulled at the lower side of the tire. Then the chain section 3 with the hook 8 is passed through the eyelet 6' of the right spring 12 and the hook 8 is hooked on the left spring. If the chain section 3 is longer, it is passed through the eyelet 6' of the left spring 12 and connected by means of said hook back to the right at the same chain section 3. In each of the eyelets 6' of the right and the left spring 12 is introduced an insert 13 in such a way that it leans against the cap of the wheel.

What we claim is:

1. A quick-mounting snow-chain assembly for a motor vehicle tire, comprising:

a continuous inner chain formed at one end with a hook and at its other end with an eye adapted to receive said hook, said inner chain having a length equal substantially to the diameter of said tire along a flank thereof against which said inner chains is intended to lie;

an outer chain comprising a relatively short chain member and a relatively long chain member, and a releasable hook and eye connection between proximal ends of said members, said relatively short chain member having a length approximately equal to half the circumference of said tire along the flank thereof at which said outer chain is intended to lie, said relatively long chain member having a length in excess of half of the latter circumference;

an eye on the free end of said relatively short chain member adapted to receive said relatively long chain member;

a hook on the free end of said relatively long chain member;

a first mounting spring having a pair of arms anchored to spaced apart locations along one of said chain members and a second mounting spring having arms connected to spaced apart locations along the other of said chain members, each of said springs defining an eyelet between the respective arms whereby said relatively long chain member can pass through said eye at the free end of said relative short chain member and thence through one of said eyelets to that said hook at said free end of said relatively long chain member can engage in the other eyelet; and respective elastic inserts received in each of said eyelets.

* * * * *